United States Patent
Dittia et al.

(10) Patent No.: US 6,826,186 B1
(45) Date of Patent: *Nov. 30, 2004

(54) METHOD AND APPARATUS FOR DISTRIBUTING PACKETS ACROSS MULTIPLE PATHS LEADING TO A DESTINATION

(75) Inventors: Zubin D. Dittia, Sunnyvale, CA (US); John Andrew Fingerhut, San Mateo, CA (US); Daniel E. Lenoski, San Jose, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/519,715

(22) Filed: Mar. 7, 2000

(51) Int. Cl.[7] .................................. H04L 12/28
(52) U.S. Cl. ............... 370/395.31; 370/392; 370/396
(58) Field of Search ........................ 370/351, 369, 370/370, 372, 389, 392, 394, 395.1, 396, 397, 395.2–395.31, 395.4–395.52, 395.7, 400, 412, 417, 464–468

(56) References Cited

U.S. PATENT DOCUMENTS

| | | | |
|---|---|---|---|
| 4,439,763 A | * 3/1984 | Limb | 370/403 |
| 4,663,748 A | * 5/1987 | Karbowiak et al. | 370/224 |
| 5,018,133 A | * 5/1991 | Tsukakoshi et al. | 370/256 |
| 5,128,932 A | * 7/1992 | Li | 370/236 |
| 5,457,679 A | * 10/1995 | Eng et al. | 370/395.31 |
| 5,488,608 A | * 1/1996 | Flammer, III | 370/400 |
| 6,047,330 A | * 4/2000 | Stracke, Jr. | 370/409 |
| 6,263,065 B1 | * 7/2001 | Durinovic-Johri et al. | 379/266.03 |
| 6,496,510 B1 | * 12/2002 | Tsukakoshi et al. | 370/401 |
| 6,538,991 B1 | * 3/2003 | Kodialam et al. | 370/229 |
| 6,556,578 B1 | * 4/2003 | Silberschatz et al. | 370/412 |
| 6,621,794 B1 | * 9/2003 | Heikkinen et al. | 370/235 |

* cited by examiner

Primary Examiner—Hassan Kizou
Assistant Examiner—David Odland
(74) Attorney, Agent, or Firm—The Law Office of Kirk D. Williams

(57) ABSTRACT

According to the invention, methods and apparatus are disclosed for selecting one of multiple of paths between two points over which to route a data item based on the destination of the data item and the traffic between the two points over the multiple paths. A switching system can use the disclosed methods and apparatus to more efficiently distribute data packets among switching fabrics than currently accomplished by known techniques. In one implementation, distribution cycles have been established for sending data between two points, where each path between the endpoints is used a predetermined number of times (e.g., one, two) within each cycle. To economize the amount of traffic data collected, the multiple paths can be partitioned into subsets for which traffic data is maintained only for the current subset. Additionally, the distribution of traffic between the two points can be further partitioned into traffic of a particular type or priority between the two points.

27 Claims, 8 Drawing Sheets a bits b bits　　　　　　　c bits b' bits　　　　　　　c bits

METHOD AND APPARATUS FOR DISTRIBUTING PACKETS ACROSS MULTIPLE PATHS LEADING TO A DESTINATION

FIELD OF THE INVENTION

This invention relates to networking and switching systems; and more particularly, this invention relates to distributing traffic destined for a common location among interconnection elements, including interconnection networks, systems, links, and devices and/or other communications mechanisms.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packet technology typically allows multiple information types to be transmitted over the same transmission lines and using the same packet switching systems and devices.

As used herein, the term "packet" refers to packets of all types, including fixed length cells and variable length packets. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof.

Consumers and designers of these systems typically desire high reliability and increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

Two commonly used techniques of distributing traffic among the multiple paths between a source and destination are a pure round robin distribution and a pure random distribution. Both of these techniques fail to consider the destination or a downstream point in the network when distributing the traffic. The pure round robin technique repetitively sequences through each of the multiple paths in the same order for traffic without regard to a packet's destination. The pure random distribution technique randomly selects one of the multiple paths without regard to a packet's destination. However, such techniques are deficient in their resultant throughput. Desired are improved methods and systems for achieving greater throughput.

SUMMARY OF THE INVENTION

According to the invention, systems, apparatus and methods are disclosed for selecting between multiple paths between identified starting and ending points to route a data item. An embodiment of the invention includes a packet switching system, which typically comprises multiple distributors, multiple receivers, and multiple interconnection elements forming multiple paths between each of the multiple distributors and each of the multiple receivers. The distributors select between the multiple interconnection elements to route a particular packet based at least in part on a destination of the packet.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
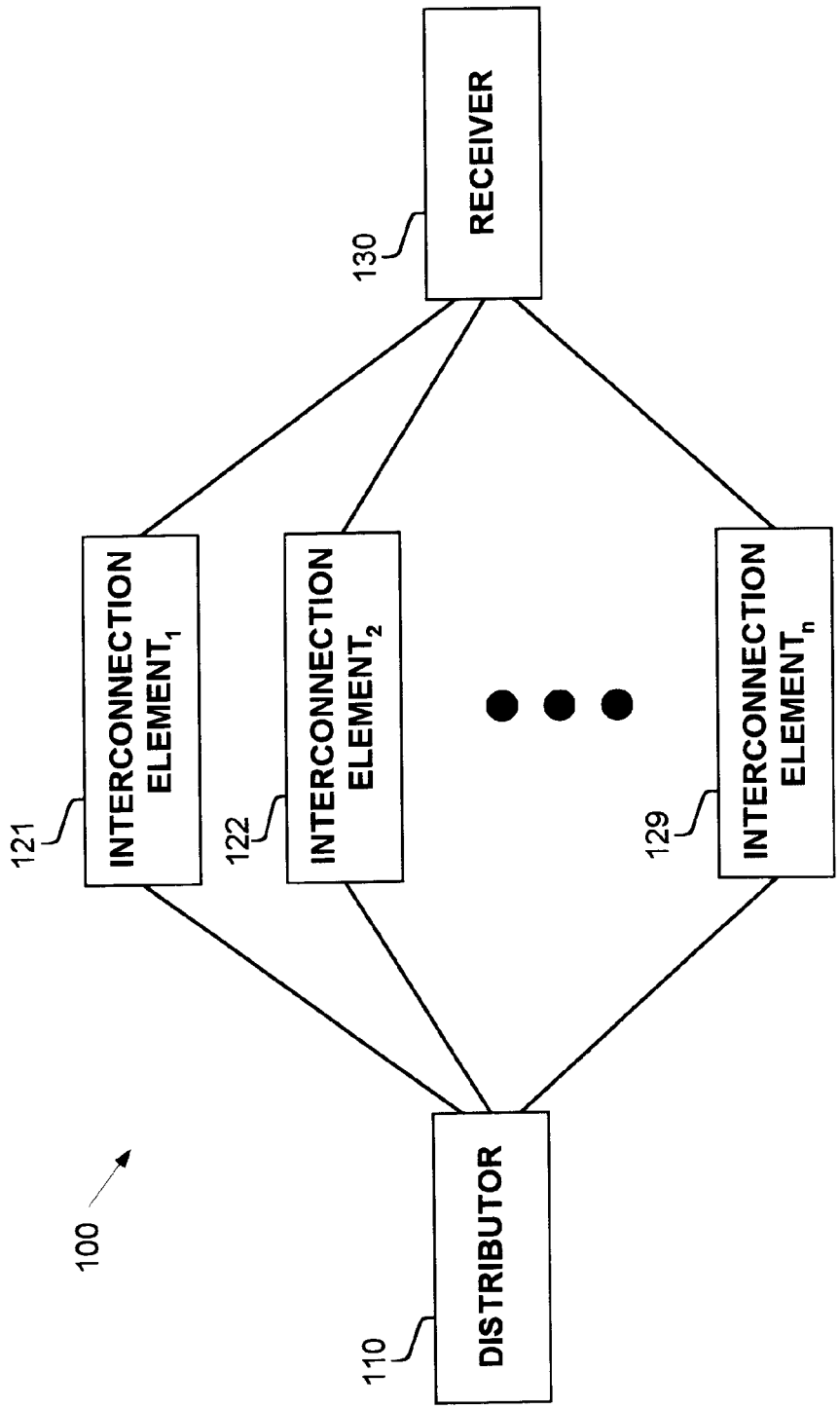
FIGS. 1A–C are block diagrams of a few of many possible operating environments.

Methods and apparatus are disclosed for, inter alia, distributing packets among multiple interconnection elements and determining which of a multiple paths between identified starting and ending points to route a data item. Embodiments of the invention include various elements and limitations, with no one element or limitation contemplated as being a critical element or limitation. Each of the claims individually recite an aspect of the invention in its entirety. Moreover, such embodiments may include, inter alia, systems, integrated circuit chips, methods, and computer-readable medium containing instructions. The embodiments described hereinafter embody various aspects and configurations within the scope and spirit of the invention.

Methods and apparatus are disclosed herein for determining which one of multiple paths between identified starting and ending points to route a data item, and for distributing traffic among multiple paths between a starting and an ending point in a network or system. Such methods and apparatus may be practiced as part of a network, computer system, or any other system in which information is transmitted between two points over multiple paths. Moreover, the route may be determined at the point of traffic distribution, or at another location which provides the determined route to the point of traffic distribution, such as including the determined route as part of a data packet (including adding a routing header to the information packet) or possibly using out of band signaling to a distribution point. Many different embodiments are possible in keeping with the scope and spirit of the invention.

The efficient distribution of traffic also simplifies resequencing of the packets at the destination or some other downstream location back into their original order. For example, the receiver resequences packets from a particular source or stream back into their original order using one of numerous techniques known in the art. Moreover, some embodiments described herein further engineer the traffic between selected starting and ending points for each type and/or priority of traffic.

Various embodiments and mechanisms for distributing traffic as described herein provide increased throughput over prior approaches (e.g., pure round robin, random distribution technique, etc.) that make routing decisions without regard to a destination or downstream point in the network. Typically, a packet may take one of multiple paths through a switching system to reach a particular destination. Such a switching system may comprise multiple interconnection networks, with each of these interconnection networks providing a set of one or more distinct paths between each of the inputs and outputs of the switching system. The prior techniques typically, at each of the input ports, distribute incoming data packets by sequencing through or randomly selecting the path over which to route the information packet without regard to the destination of the particular packet or traffic pattern between the input port and destination.

In contrast, in one embodiment, the traffic distribution at each distribution point is engineered for the traffic being sent to a particular destination (or through some downstream point in the network). In this manner, the traffic pattern across the paths between selected starting and ending points can be engineered to achieve increased performance. Embodiments distribute traffic among one or more paths and/or interconnection elements, including, but not limited to links, interconnection networks, planes of a packet switch, individual routes through an interconnection network, individual routes through a device (e.g., a packet switch) coupling the starting and ending points, etc.

For example, in one embodiment, a distributor maintains a data structure at each of the distribution points for each of the destinations. The embodiment updates these data structures to indicate the traffic distribution between the distribution point and each of the destinations, which allows the embodiment to select an optimal path over which to route a next packet of information. Other embodiments update the data structure using network congestion information instead of, or in addition to the traffic distribution information.

In the same manner, in one embodiment, a distributor maintains a data structure at each of the distribution points for each of the destinations for each of the types and/or priorities of traffic. This data structure is updated to indicate the traffic distribution between the distribution point and each of the destinations for each of the types and/or priorities of traffic, which allows selection of an appropriate path over which to route a next packet of information. In certain embodiments, the overall traffic over a particular path (e.g., interconnection network, or one of the multiple paths through the interconnection network) is considered in performing the traffic engineering. Once again, network congestion information may be used instead of, or in addition to the traffic distribution information.

In some embodiments, various optimization techniques are employed. For example, in one embodiment, a distributor determines the traffic distribution based on a certain maximum number of packets to be sent over a particular path. In other words, for each distribution cycle, a packet is sent from a particular starting point to a particular destination point over each of the possible paths a predetermined number of times. In the case of the predetermined number of times being one, then a bitmap at each of the distribution points can be maintained to indicate which of the paths have been used, or those paths still available, within the current distribution cycle. Various techniques can be employed to select which particular path to use within a distribution cycle, including use of deterministic (e.g., a round robin between paths leading to the particular destination) and/or non-deterministic methods (e.g., a random selection of one of the paths leading to the particular destination). In certain embodiments, selection between the available paths remaining within a distribution cycle is based on current traffic over a particular path (or on the path's respective interconnection network). For example, if the switching system employs buffers or queues, then selection between those available paths may be made based on which has the smallest queue length.

Certain embodiments employ additional optimization techniques to decrease the size of the data structure used to maintain one or more of the traffic patterns and/or simplify the processing to determine which of multiple paths to select for routing a particular packet. For example, by partitioning the space of possible paths which may be selected into groups or subsets, the amount of space and processing required can be decreased.

To help demonstrate this aspect of such embodiments, assume that a certain switching system has 2048 input ports and 2048 output ports (with each output port corresponding to an identifiable destination for a packet) and thirty-two interconnection networks (or interconnection elements) interconnecting the input and output ports. Then, each of the 2048 input ports would maintain a data structure tracking the packets sent to each of the 2048 output ports for each of the 32 interconnection networks. In the case where only a single packet sent to a particular output port is allowed to be routed only once in a distribution cycle over each interconnection network, a bitmap of 32 bits could be used to track each port having been selected to be sent, or remaining to be sent a packet in a given distribution cycle. This would require each of the 2048 input ports to maintain 32 bits times 2048 output ports equaling 64 Kbits of traffic data structure. One technique to decrease the size of this bitmap is to partition the 32 interconnection networks into groups within a distribution cycle. A cycle selector (e.g., a counter for each destination) could be used to select a current group within a distribution cycle. Thus, the size of a bitmap at each input port when using four groups within a distribution cycle is one-fourth of the size of a bitmap used for a distribution cycle without groups (e.g., 16 Kbits–64 Kbits divide by four groups). The amount of savings becomes even more dramatic as the number of interconnection networks or paths increase, and if distribution cycles are used for each type and/or priority of traffic. Such is the case for the size of the traffic data structure required when traffic is distributed based on each of the multiple paths within an interconnection network (rather than only based on which of the interconnection networks is used). Many other possible embodiments employing various optimization techniques and combinations thereof are possible in keeping within the scope and spirit of the invention.

One embodiment includes a packet switching system, which includes a plurality of distributors; a plurality of receivers; and a plurality of interconnection elements coupled to form a plurality of paths between each of the plurality of distributors and each of the plurality of receivers, wherein each of the distributors selects one of the plurality of interconnection elements to which to route a particular packet based at least in part on a destination of the packet.

In one embodiment, each of the plurality of distributors makes routing decisions independently of the other distributors. In one embodiment, each of the plurality of distributors selects a distinct one of the plurality of interconnection elements to route the particular packet based on a traffic pattern within the packet switching system. In one embodiment, each of the plurality of distributors selects a distinct one of the plurality of interconnection elements to route the particular packet based on congestion within the packet switching system. In one embodiment, at least one of the interconnection elements includes an interconnection network. One embodiment further includes control logic to enable each of the plurality of distributors to send packets to each of the interconnection elements only a predetermined number of times in a distribution cycle for a particular destination. In one embodiment, the predetermined number of times is one. One embodiment includes buffers to buffer at least a portion of the data packets to be sent by the plurality of distributors, wherein each of the distributors selects which of the interconnection elements to send a particular packet to based on a set of queuing lengths for the interconnection elements. One embodiment includes control logic to enable each of the plurality of distributors to send packets to each of the interconnection elements only a predetermined number of times in a distribution cycle, where a different distribution cycle is defined for each combination of a particular destination and a type of service. In one embodiment, the predetermined number of times is one. One embodiment includes buffers to buffer at least a portion of the data packets to be sent by the plurality of distributors, wherein each of the distributors selects which of the interconnection elements to send a particular packet to based on a set of queuing lengths for the interconnection elements. In one embodiment, each of the interconnection elements include an interconnection network, with each interconnection network providing a second plurality of paths a distinct one of the plurality of distributors and receivers; and the packet switching system further includes control logic to enable each of the plurality of distributors to send packets over each of the second plurality of paths for each of the interconnection elements only a predetermined number of times in a distribution cycle for a particular destination.

One embodiment includes a packet switching system which includes a plurality of interconnection elements forming a plurality of paths between a distributor and a receiver; the distributor, coupled to the interconnection elements, to selectively route a plurality of packets to at least two of the interconnection elements; the receiver, coupled to the interconnection elements, to receive the packets from the interconnection elements; and control logic to maintain a data structure indicating a traffic pattern of at least a subset of the packets to be routed by the distributor; wherein the distributor selects which of the interconnection elements to route each of the packets based at least in part on the destination of the particular packet and the data structure indicating the traffic pattern.

In one embodiment, at least one of the interconnection elements includes a switch fabric. In one embodiment, the destination is the receiver, an output port of the receiver, an output port of the switching system, or a destination external to the receiver. In one embodiment, the destination for the particular packet is indicated or implied by a field within the particular packet. In one embodiment, the control logic is implemented in firmware, hardware or software. In one embodiment, the data structure includes an indication of one or more of the interconnection elements that were previously selected to receive, or remain available to receive one or more of the packets. In one embodiment, the data structure includes a set of indicators to indicate which of the interconnection elements were selected to, or remain available to receive one of the packets in a current distribution cycle, wherein a particular interconnection element is only selected a predetermined number of times in the current cycle. In one embodiment, the predetermined number of times in the current distribution cycle is one. In one embodiment, the switching system further comprises a set of buffers to receive one or more of the packets from the distributor and to forward the received packets to the interconnection elements. In one embodiment, the distributor selects which of the interconnection elements to route the packet to based on the use of the buffers. In one embodiment, the data structure includes a bitmap to represent the interconnection elements which were selected to receive, or remain available to receive one or more of the packets in the current cycle. In one embodiment, the switching system supports a plurality of types of services; the data structure includes a set of indicators to indicate for each type of service for each destination which of the plurality of interconnection elements were selected to receive, or remain available to receive one or more of the packets in a current distribution cycle defined for each destination and type of service; wherein a particular interconnection element is only selected a predetermined number of times in the current cycle for a particular type of service. In one embodiment, the types of service include a service quality or a service priority. In one embodiment, the predetermined number of times is one. In one embodiment, the data structure includes a bitmap representation of a current subset of the interconnection elements which were previously selected to receive, or remain available to receive, one or more of the packets in a current cycle; and the packet switching system further comprises a selector to identify the current subset. In one embodiment, a packet is only sent to a particular interconnection element in the current subset of the interconnection elements a first predetermined number of times in the current cycle, and each subset is only used to select interconnection elements a second predetermined number of times in the current cycle. In one embodiment, the first predetermined number of times is one; and the second predetermined number of times is one. In one embodiment, the distributor is an input interface, a switching element, a router, or a transmission element. In one embodiment, the receiver is an output interface, a switching element, a router, or a transmission element. In one embodiment, the receiver resequences the received packets.

One embodiment includes a packet switching system supporting a plurality of types of services, with the packet switching system including a plurality of interconnection networks forming a plurality of paths between a distributor and a receiver; the receiver, coupled to the plurality of interconnection networks, to receive packets from the interconnection networks; and the distributor, coupled to the plurality of interconnection networks, to selectively route a plurality of packets during a plurality of distribution cycles; wherein a distribution cycle is defined for each combination of a destination and type of service; wherein a packet having a particular type of service is only sent to a particular interconnection network a predetermined number of times in a corresponding distribution cycle.

In one embodiment, the predetermined number of times is one. In one embodiment, the distributor is an input interface, a switching element, a router, or a transmission element. In one embodiment, the receiver is an output interface, a switching element, a router, or a transmission element.

One embodiment includes a packet switching system supporting a plurality of types of services, with the packet switching system including a plurality of interconnection networks each having a plurality of paths between a distributor and a receiver; the receiver, coupled to the plurality of interconnection networks, to receive packets from the interconnection networks; and the distributor, coupled to the plurality of interconnection networks, to selectively route a plurality of packets during a plurality of distribution cycles;

wherein a distribution cycle is defined for each combination of a destination and type of service; wherein a packet having a particular type of service is only sent to a particular route through a particular interconnection network a predetermined number of times in a corresponding distribution cycle.

One embodiment includes an automated method to determine which of a plurality of paths between an identified first point and an identified second point to route a data item, with the method including getting the data item for sending to the identified second point; maintaining a traffic data structure; selecting at least one of the plurality of paths leading to the identified second point over which to route the data item based, at least in part, on the identified second point and the traffic data structure.

In one embodiment, the first point comprises an input interface of a packet switching system. In one embodiment, the first point comprises an input port of an interface of a packet switching system; and the traffic data structure includes traffic pattern information between the input port of the input interface and the identified second point. In one embodiment, the plurality of paths include a plurality of packet switching fabrics. In one embodiment, the traffic data structure includes traffic pattern information between the identified first and second points. In one embodiment, the traffic data structure includes an indication of which of the plurality of paths available to be sent a packet, or those previously selected to be sent a packet. In one embodiment, the traffic data structure includes a set of indicators to indicate which of the plurality of paths were selected to be sent a data item in a current cycle, wherein a data item is only selected to be sent to a particular path a predetermined number of times in the current cycle. In one embodiment, the predetermined number of times in the current cycle is one. One embodiment includes monitoring a plurality of queue lengths corresponding to the plurality of paths; wherein the at least one of the plurality of paths is selected based on the monitored queue lengths. In one embodiment, the traffic data structure includes a bitmap to represent the plurality of paths which were selected to be sent, or remain available to be sent data items in the current cycle. One embodiment includes a computer-readable medium having computer-executable instructions for performing the method steps. One embodiment includes a simulation program having computer-executable instructions for modeling the method steps.

One embodiment includes a method performed by a packet switching system having a plurality of inputs, a plurality of outputs, and a plurality of paths between the plurality of inputs and the plurality of outputs, with the method including receiving a packet at one of the plurality of inputs for routing to a predetermined destination over one of the plurality of paths; selecting a distinct one of the plurality of paths over which to route the received packet based, at least in part, on the predetermined destination; and routing the packet over the selected path. One embodiment maintains a traffic data structure; wherein the selected path is further selected based on data maintained in the traffic data structure. One embodiment maintains a network congestion data structure; wherein the selected path is further selected based on data maintained in the network congestion data structure.

FIGS. 1A–C and 2 and their discussion herein are intended to provide a description of a general environment in which the distribution techniques described herein may be practiced for distributing packets across multiple paths leading to a destination. The distribution technique is not limited to a single networking or computing environment. Rather, the architecture and functionality supporting such a distribution as taught herein and would be understood by one skilled in the art is extensible to an unlimited number of networking, communication, and computing environments and embodiments in keeping with the scope and spirit of the invention.

FIG. 1A illustrates an exemplary networked operating environment 100. A distributor 110 routes data, typically in the form of a packet of information, to receiver 130 over interconnection elements 121–129. The number of interconnection elements 121–129 may vary depending on the application and implementation of the system. Distributor 110 employs various techniques to efficiently route information over interconnection elements 121–129 to receiver 130 in accordance with the present invention. Distributor 110 determines the particular route itself for each packet, or the particular route could be selected by another device in which the selected route is relayed to distributor 110 via some mechanism, such as including the selected route in the packet's header or via routing signaling messages.

Figure 1B:
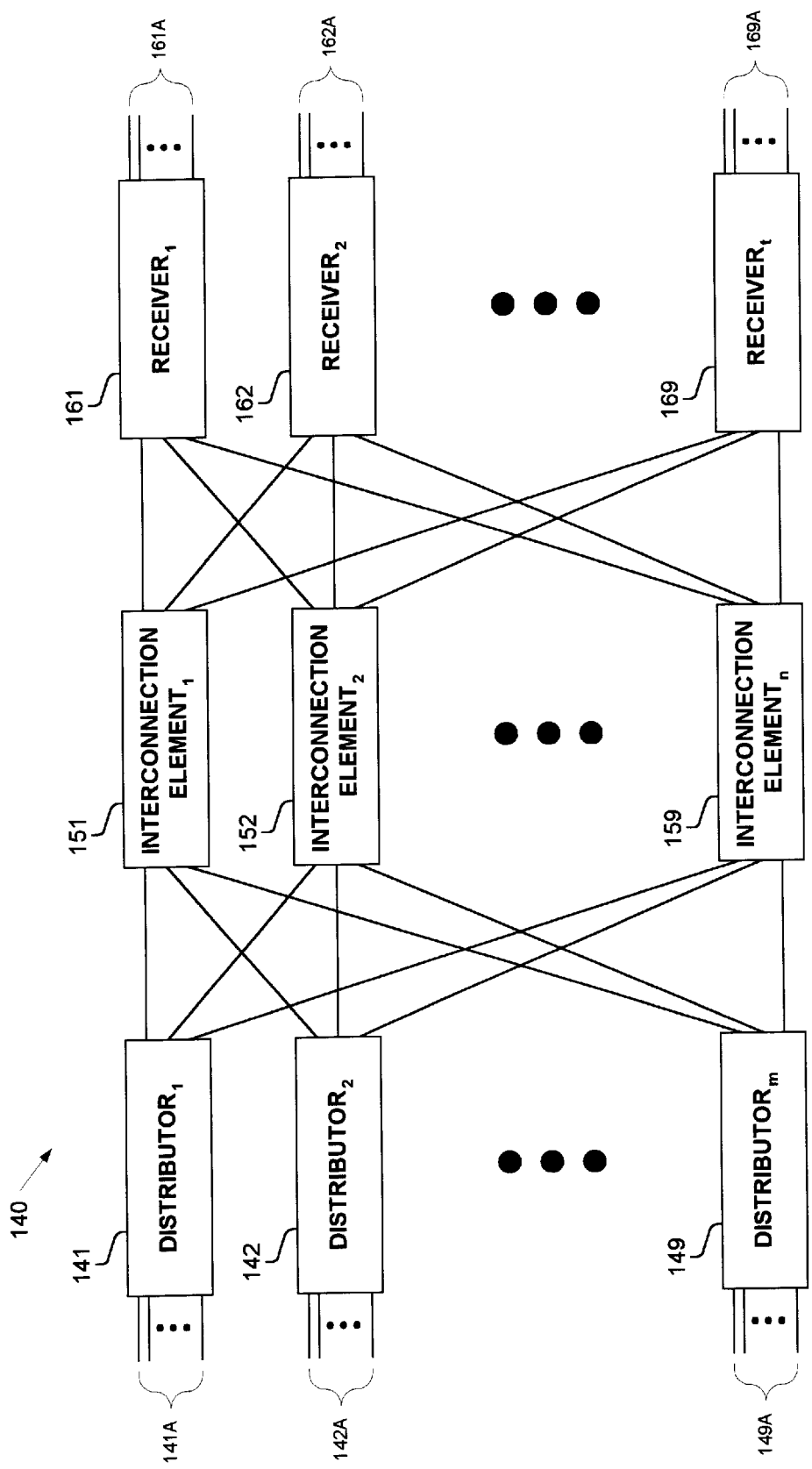

FIG. 1B illustrates another exemplary networked operating environment 140. Multiple distributors 141–149 individually route data, typically in the form of packets of information, to receivers 161–169 over interconnection elements 151–159. Illustrated in FIG. 1B are m distributors 141–149, n interconnection elements 151–159, and t receivers 161–169. The number of distributors 141–149, interconnection elements 151–159, and receivers 161–169 may vary depending on the application and implementation of the system. In the illustrated embodiment, distributors 141–149 have inputs 141A–149A, respectively, and receivers 161–169 have outputs 161A–169A, respectively. Various embodiments employ different destinations used in determining which path to route a packet of information. For example, the destination may be a particular one of receivers 161–169, or a particular one of outputs 161A–169A of receivers 161–169. In a similar manner, various embodiments employ different starting points used in determining which path to route a packet of information. For example, a starting point could be a particular one of distributors 141–149, or a particular one of inputs 141A–149A of distributors 141–149.

Figure 2:
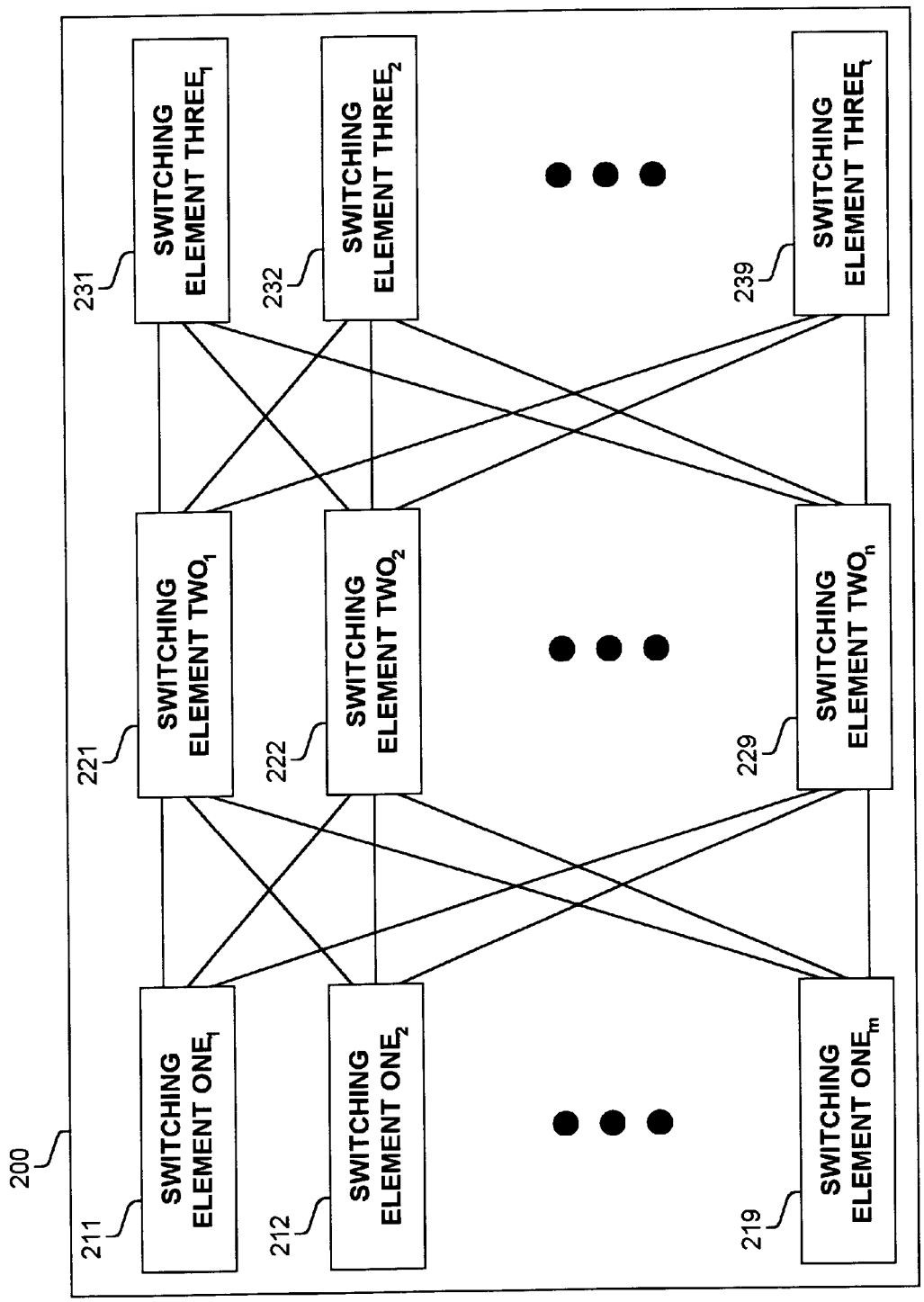
FIG. 2 is a block diagram illustrating an interconnection network.

Turning briefly now to FIG. 2, illustrated is one of many possible embodiments of an interconnection element 200, which could be used for some or all of the interconnection elements 121–129 (FIG. 1A) and for some or all of the interconnection elements 151–159 (FIG. 1B). Referring to FIG. 2, an interconnection element 200, may comprise, for example, a switching fabric, switching plane, or other network, having a number of switching elements 211–239. Illustrated is a three-stage packet interconnection element 200, with a first stage of switching elements one 211–219, interconnected with a second stage of switching elements two 221–229, which are interconnected with a third stage of switching elements three 231–239.

Returning to FIGS. 1A–B, it should be noted that interconnection elements 121–129 (FIG. 1A) and interconnection elements 151–159 (FIG. 1B) could also be a single connection or wire (instead of an interconnection network), or numerous other communications mechanisms, including a single or multiple networks being of the same or of a different type. In the case of a single connection, an embodiment of the system shown in FIG. 1A is a distributor 110 interconnected by multiple wires 121–129 to receiver 130.

Figure 1C:
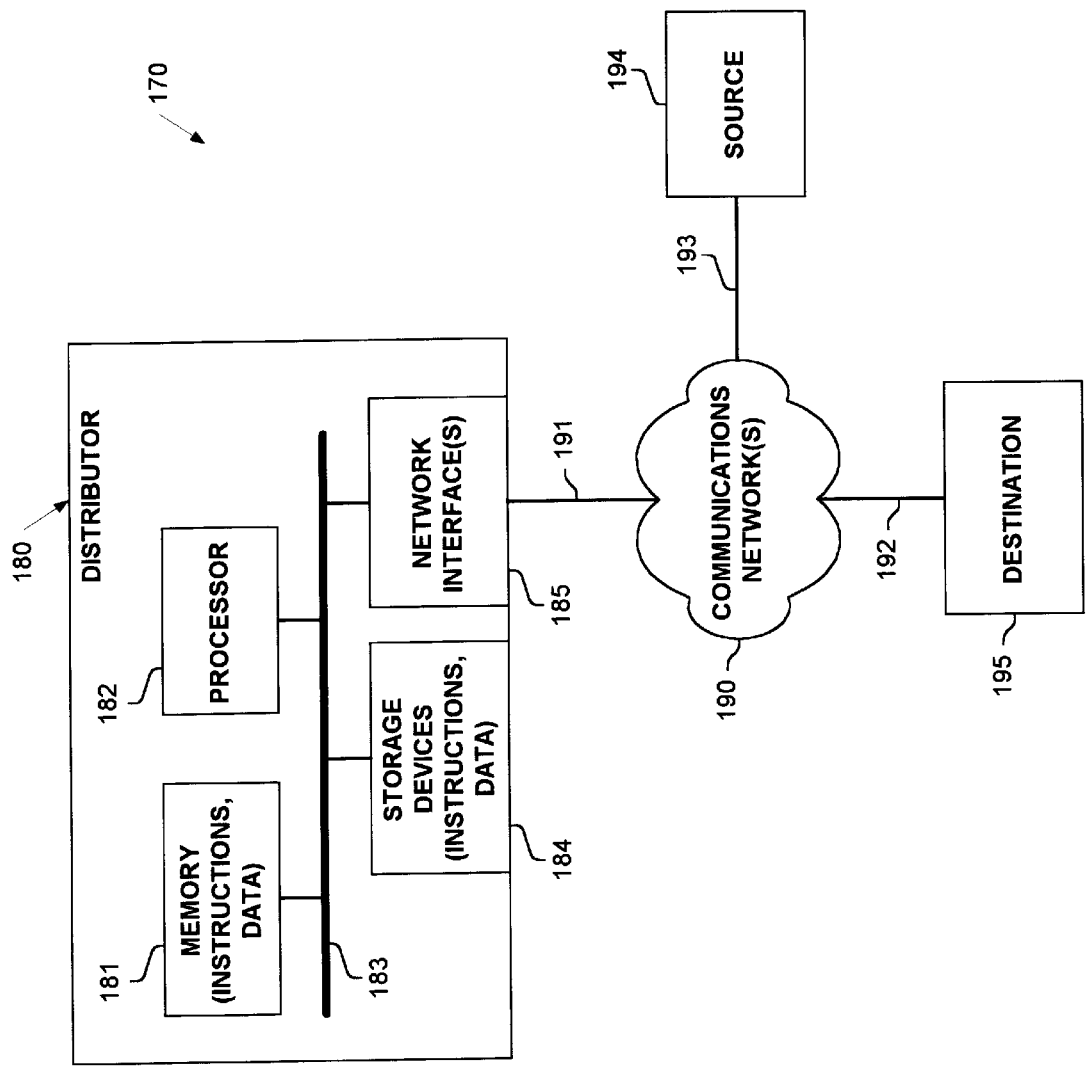

FIG. 1C illustrates another operating environment 170. Referring to FIG. 1C, a distributor 180 is interconnected by one or more links 191 to communications network(s) 190 and to one or more destinations 195 over one or more links 192. Data may be originated within distributor 180, or from one or more external sources 194 interconnected thereto, using links 193. Distributor 180 could take many forms including a personal computer or workstation. Additionally, distributor 180 could even be a traditional router, in which case distributor 180, although not required, would typically have multiple network interfaces 185, with separate communications networks 190 and links 191 connecting to the source 194 and destination 195.

The embodiment of the distributor 180 illustrated in FIG. 1C, or a variant thereof, can also be used as distributor 110 of FIG. 1A, or distributor 141–149 of FIG. 1B. Distributor 180 typically comprises a standard computer platform, a specialized computer or communications platform, including, but not limited to a desktop computer, a laptop computer, personal data assistant, a handheld computer, or a router. For purposes of simplicity, only one distributor 180 is shown; however, the number of distributors 180 supported by the distribution technique disclosed herein is unbounded.

In an embodiment, distributor 180 comprises a processor 182, memory 181, storage devices 184, and one or more network interface(s) 185, which are electrically coupled via bus 183. Network interface(s) 185 are connected to one or more communications network(s) 190 (e.g., one or more networks, including, but not limited to the Internet, private or public telephone, cellular, wireless, satellite, cable, local area, metropolitan area and/or wide area networks) over one or more links 191. Memory 181 is one type of computer-readable medium, and typically comprises random access memory (RAM), read only memory (ROM), integrated circuits, and/or other memory components. Memory 181 typically stores computer-executable instructions to be executed by processor 182 and/or data which is manipulated by processor 182 for implementing functionality described herein. Storage devices 184 are another type of computer-readable medium, and typically comprise disk drives, diskettes, networked services, tape drives, and other storage devices. Storage devices 184 typically store computer-executable instructions to be executed by processor 182 and/or data which is manipulated by processor 182 for implementing functionality described herein.

As used herein, computer-readable medium is not limited to memory and storage devices; rather, computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit information.

Figure 3A:
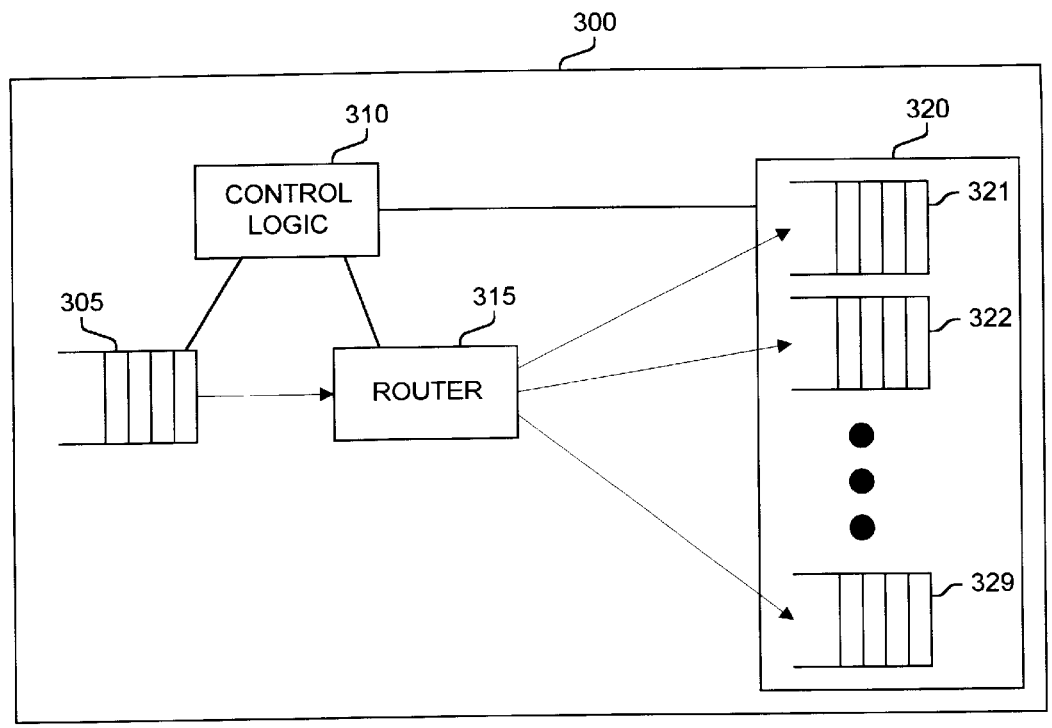
FIGS. 3A–B are block diagrams of a control and routing logic arrangement.
Figure 3B:
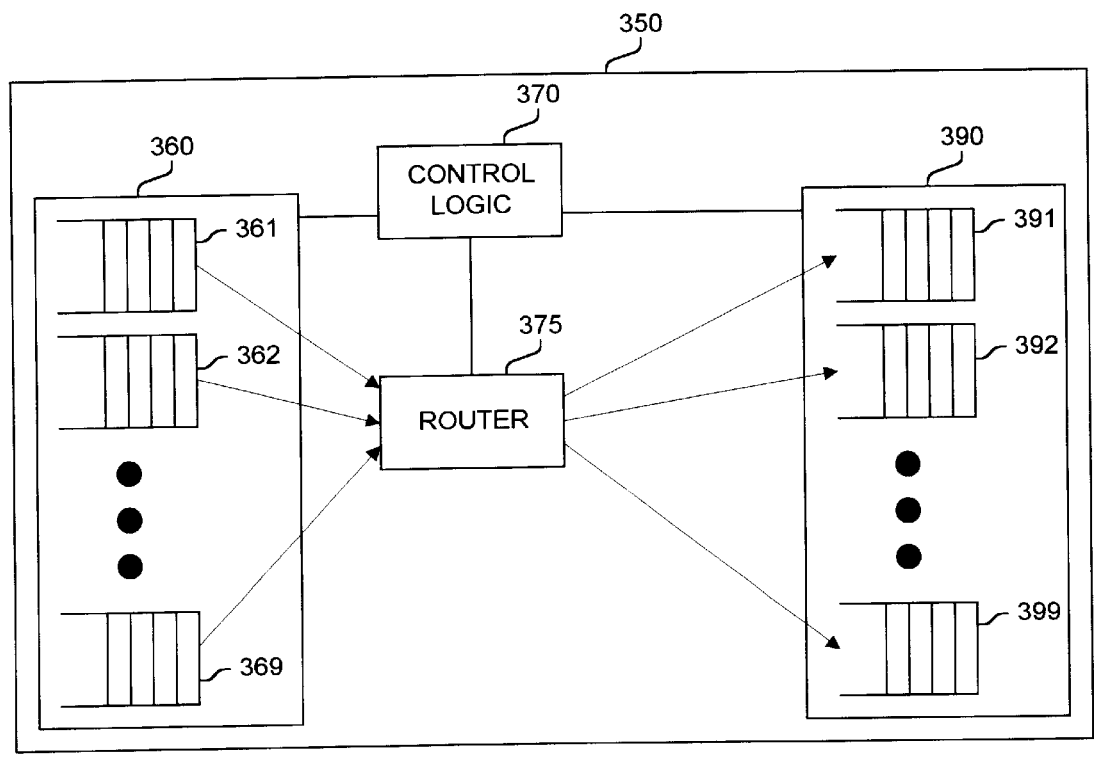

FIGS. 3A–B illustrate two of many possible embodiments for a distributor. First, FIG. 3A illustrates an embodiment 300, which could be used as distributor 110 (FIG. 1A) or a distributor 141–149 (FIG. 1B). Distributor 300 obtains data to be routed to the interconnection elements and determines the particular interconnection element over which to route the data. Element 305 represents a queue or buffer which contains the data to be routed, where this data is received from an external source or internally generated. Element 320 represents a buffer or queue which can optionally be partitioned into multiple buffers or queues 321–329 corresponding to different destinations, types or priorities for the data. In one embodiment, control logic 310, which may include one or more data structures, uses the destination of the data packets and/or lengths of the individual buffers or queues 321–329 in determining over which path or interconnection element the data should be routed. Control logic 310 informs router 315 the path or interconnection element over which to route the data or which buffer or queue 321–329 to place the data. Router 315 then places the data into the appropriate buffer or queue 321–329, or transmits the data to or over the appropriate interconnection device.

FIG. 3B illustrates another embodiment 350 of a distributor, which could be used as distributor 110 (FIG. 1A) or a distributor 141–149 (FIG. 1B). Distributor 350 gets data to be routed to the interconnection elements and determines the particular interconnection element over which to route the data. Elements 360–369 represent one or more queues or buffers which contains the data to be routed, where this data is received from one or more external sources or internally generated. Element 390 represents a buffer or queue which can optionally be partitioned into multiple buffers or queues 391–399 corresponding to different destinations, types or priorities for the data. In one embodiment, control logic 370, which may include one or more data structures, uses the destination of the data packet and lengths of the individual buffers or queues 391–399 in determining over which path or interconnection element the data should be routed. Control logic 370 informs router 375 the path or interconnection element over which to route the data or which buffer or queue 391–399 to place the data. Router 375 then places the data into the appropriate buffer or queue 391–399, or transmits the data to or over the appropriate interconnection device.

FIGS. 3A–B illustrate a small subset of the possible embodiments, while the scope of the invention is much broader. For example, the control logic and routing functions could be performed by a single entity. Also, data could be stored in a single place with data pointers used to manipulate the data rather than actually placing data in outgoing buffers or queues. Similarly, FIGS. 1A–C, and 2 also present only a small subset of the possible embodiments, while the scope of the invention is much broader. The present invention is not limited to any one particular design, rather, it is extensible to an unlimited number of designs in which multiple paths are used to route information, typically in the form of packets.

Figure 4A:
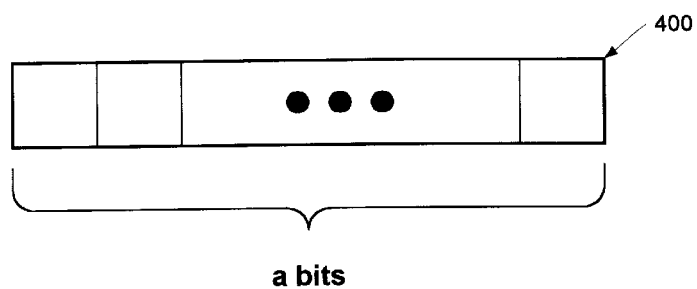
FIGS. 4A–C illustrate an exemplary data structure.
Figure 4B:
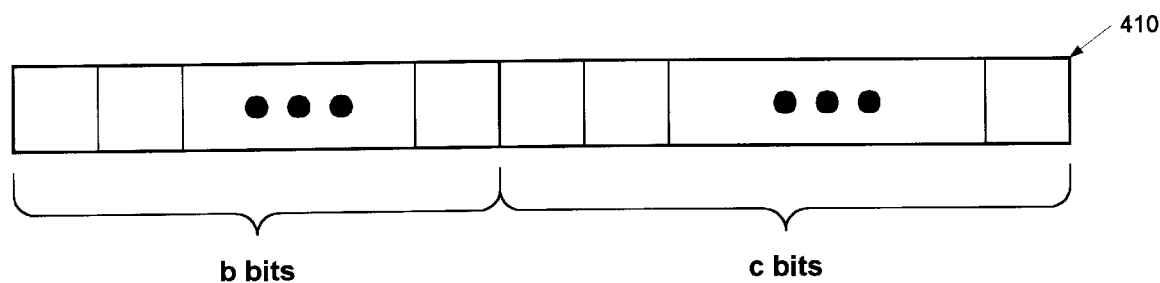
Figure 4C:
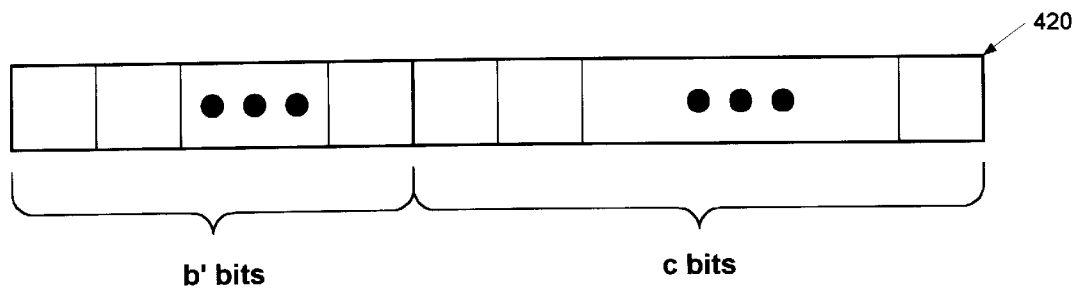

FIGS. 4A–C illustrate embodiments of a data structure used in determining which interconnection device or path a particular data packet should be routed.

A bitmap 400 having a size of a bits is shown in FIG. 4A. In one embodiment, this bitmap 400 is used to determine which of multiple paths or interconnection devices remain available in a distribution cycle for transmitting an information packet. For example, initially the bitmap could be set to all ones, with a one indicating that a path or interconnection device can be used. When a path or interconnection device is used in the cycle, the corresponding bit is set to zero. In certain embodiments, a distribution cycle might be defined to use each path or interconnection device a predetermined number of times in a distribution cycle, where this predetermined number can be one or greater. For example, each path or interconnection device might be used exactly one, two, or three times in each distribution cycle. In the case when the predetermined number is greater than one, an embodiment uses an array data structure instead of a bitmap or a group of counters. This predetermined number could be a static number initially set or determined during the operation of a switching system, or a dynamically number which changes according to the needs of the packet switching system (e.g., based on traffic loads, traffic patterns, congestion, etc.) Additionally, certain paths might be disabled from use, in which case, the corresponding bit is initially set to zero indicating it is not selectable, the possible paths might be AND'ed with a bitmap of enabled routes to produce a bitmap of possible paths to choose between, or the same result might be accomplished via some other mechanism.

The embodiment of the data structure 400 illustrated in FIG. 4A uses one bit for each path or interconnection device. FIG. 4B illustrates another embodiment for decreasing the number of bits required. For example, FIG. 4B illustrates a configuration where the number of paths or interconnection devices has been divided into b groups or subsets. In this case, a data structure 410 could be used having b+c bits, wherein b times c equals (or is greater than) a (the number of paths or interconnection devices). For example, if a is 32, then (b, c) could be one of multiple pairings of values, including (4, 8), which would require a total of 12 bits (instead of 32 bits). Thus, various embodiments could choose to distribute data across a subset of multiple paths or interconnection devices at a time, and then deterministically, randomly, or some combination thereof, traverse the subsets of paths. In which case, the number of bits required for a data structure can be dramatically reduced.

FIG. 4C provides another embodiment of a data structure 420, wherein the current subset within the distribution cycle is identified by the value of b', with b' typically being smaller than b (although not required). Thus, where the data structure 400 illustrated in FIG. 4B uses a bitmap of b bits (one bit for each of the subsets) to identify which of the subsets have been used (or remain available), data structure 420 uses the value identified in the b' bits to indicate the current subset of paths or interconnection devices within the distribution cycle. For example, if there are four subsets within a distribution cycle, typically b would be 4 bits in size, and typically b' would be 2 bits in size (e.g., a 2-bit counter). When a binary counter is used, the number of b' bits is the ceiling of $\log_2 b$. In this case, if a is 32 with four subsets within the distribution cycle, then (b',c) could be (2,8) for a total of 10 bits.

Figure 5A:
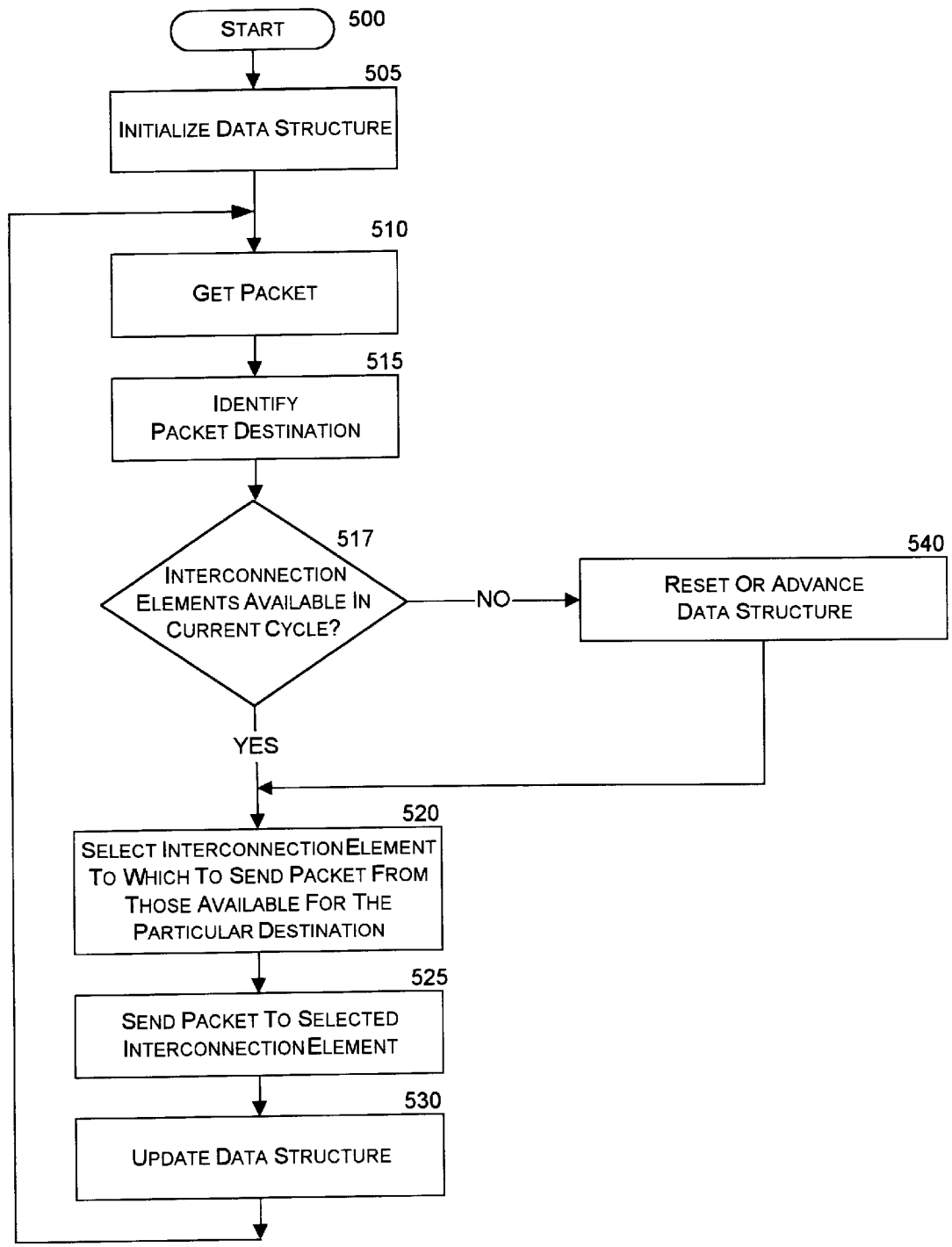
FIGS. 5A–B are flow diagrams illustrating the distribution of packets across multiple paths leading to a destination.
Figure 5B:
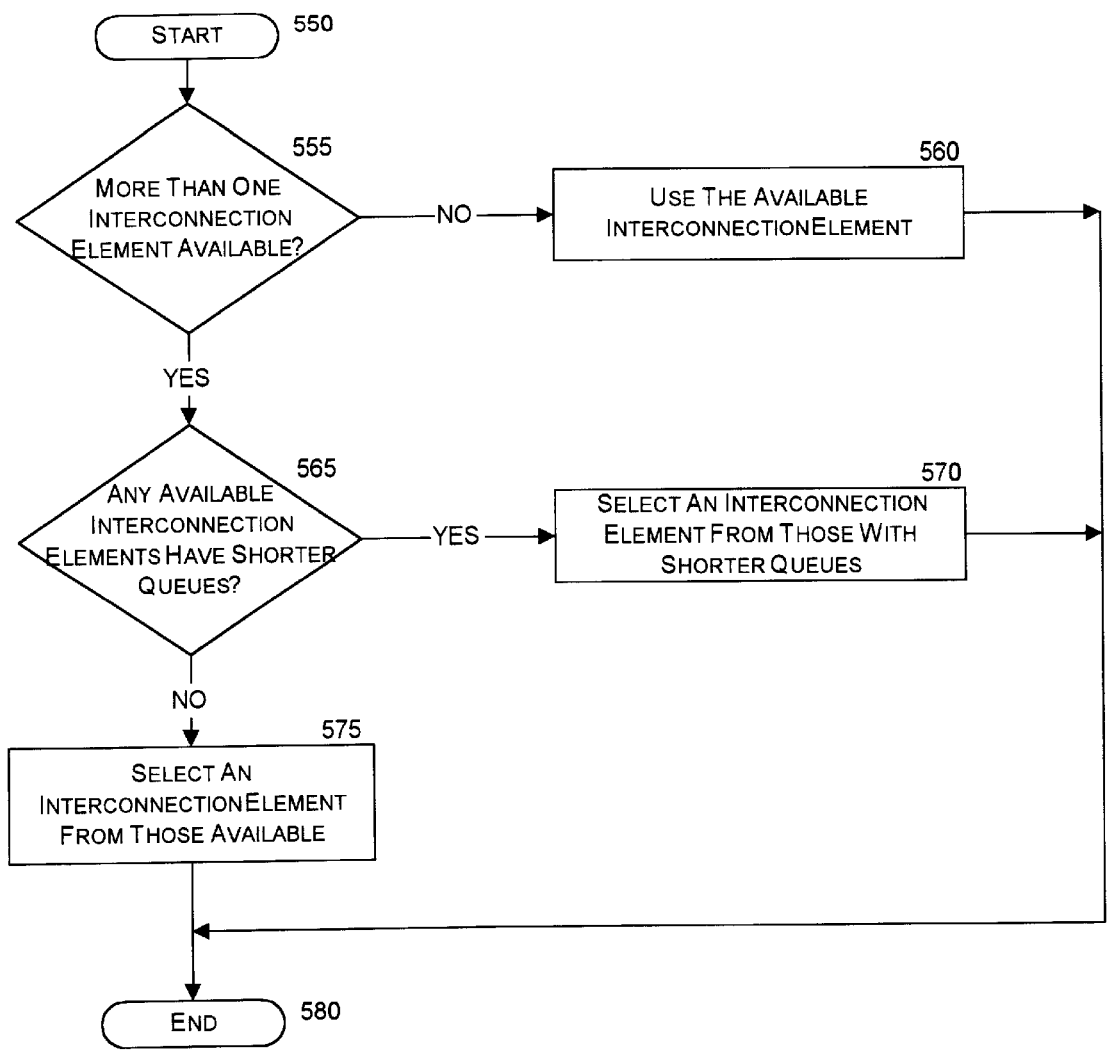

The distribution techniques described herein can be better understood by the flow diagrams of FIGS. 5A–B. FIG. 5A is a flow diagram of one embodiment of a process performed by a distributor for distributing traffic among the multiple paths. Processing begins at step 500 and proceeds to step 505, wherein a data structure is initialized. Next, in step 510, the distributor gets a packet (whether receiving from an external source, generated internally, or via some other mechanism). Next, in step 515, the distributor identifies a destination for the packet.

If all interconnection elements have been used in this cycle as determined in step 517, then the data structure is reset or advanced to process the next subset or grouping of paths or interconnection elements in step 540. Then, in step 520, the distributor selects an interconnection element to which to send the packet from those that remain available.

One embodiment of the processing of step 520 is described further in FIG. 5B. Processing begins at step 550, and proceeds to step 555, wherein the distributor identifies whether more than one interconnection element is available for routing data or packet. If there is only one interconnection element available, the distributor uses the available interconnection element as indicated by step 560. Otherwise, in step 565, the distributor determines whether any of the available interconnection elements have shorter queues. Other embodiments employ various tie-breaking mechanisms such as a random, round-robin, priority, or other predetermined ordering.

If the distributor determines that at least one of the available interconnection elements has a shorter queue, step 570 is performed to select an interconnection element from those with the shortest queues. In selecting between interconnection elements with the shortest queues a variety of methods may be employed, such as a deterministic (e.g., a round robin between paths leading to the particular destination) or randomized selection, or some combination of the two. Otherwise, in step 575, an interconnection element is selected from those which remain available. Processing then returns to step 525 of FIG. 5A as indicated by step 580.

Returning to FIG. 5A, in step 525, the packet of information is sent to the selected interconnection element (or placed in a corresponding output queue or buffer). Next, in step 530, the data structure is updated to reflect which interconnection element was used. Processing then loops back to step 510. In this manner, the distributor is able to efficiently and optimally distribute traffic among the interconnection elements.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. An apparatus for switching packets comprising:
   a plurality of distributors, each including a plurality of input ports;
   a plurality of receivers, each including a plurality of output ports; and
   a plurality of interconnection elements, each coupled to each of the plurality of distributors and each of the plurality of receivers, forming a plurality of paths between each of the plurality of distributors and each of the plurality of receivers;
   wherein each of the plurality of input ports maintains one or more data structures indicating which of the plurality of interconnection elements remain available to be selected in a current distribution cycle for each of the plurality of output ports, with a different distribution cycle defined for each input port-output port pair, and each of the plurality of input ports sends exactly a predetermined number of packets across each of the plurality of interconnection elements in a distribution cycle.

2. The apparatus of claim 1, wherein each of the plurality of input ports selects a distinct one of the plurality of interconnection elements indicated as available to send a packet in the current distribution cycle corresponding to the output port to which a particular packet is to be sent, said selection based on a traffic pattern within the apparatus.

3. The apparatus of claim 1, wherein each of the plurality of input ports selects a distinct one of the plurality of interconnection elements indicated as available to send a packet in the current distribution cycle corresponding to the output port to which a particular packet is to be sent, said selection based on congestion within the apparatus.

4. The apparatus of claim 1, wherein at least one of the interconnection elements includes an interconnection network.

5. The apparatus of claim 1, wherein the predetermined number of times is one.

6. The apparatus of claim 1, comprising buffers to buffer at least a portion of the packets to be sent from the plurality of distributors across the plurality of interconnection elements to the plurality of receivers, wherein each of the plurality of input ports selects which of the plurality of interconnection elements indicated as available to next send a packet in the current distribution cycle corresponding to the output port to which a particular packet is to be sent, said selection based on queuing lengths of said interconnection elements indicated as available in the current distribution cycle.

7. The apparatus of claim 1, wherein a different distribution cycle is defined for each combination of said input port-output port pair and a type, priority, or type and priority of service.

8. The apparatus of claim 6, wherein the predetermined number of times is at least two.

9. A packet switching system comprising:
a distributor;
a plurality of receivers; and
a plurality of interconnection elements coupled to the distributor and to each of the plurality of receivers to form a plurality of paths between the distributor and each of the plurality of receivers;
wherein a different distribution cycle is defined for each receiver of the plurality of receivers, and the distributor is configured to send exactly a predetermined number of packets across each of the plurality of interconnection elements leading to a particular receiver of the plurality of receivers in a distribution cycle corresponding to said particular receiver; and wherein the distributor is not predetermined to send packets in a round-robin fashion across the plurality of interconnection elements leading to said particular receiver in a distribution cycle corresponding to said particular receiver;
wherein, for a packet being sent to a specific receiver of the plurality of receivers, the distributor is configured to identify a next particular interconnection element of the plurality of interconnection elements that remain available in a current distribution cycle corresponding to the specific receiver.

10. The packet switching system of claim 9, comprising a set of buffers, the set of buffers including a buffer for each of the plurality of interconnection elements for buffering packets to be sent over a corresponding one of the plurality of interconnection elements; and
wherein the distributor is configured to identify the next particular interconnection element based on the occupancies of buffers for said plurality of interconnection elements that remain available in the current distribution cycle corresponding to the specific receiver.

11. The packet switching system of clam 9, wherein the distributor includes a bitmap data structure to represent which of said plurality of interconnection elements remain available in the current distribution cycle corresponding to the specified receiver.

12. The packet switching system of claim 9, wherein the distribution cycle is defined for a combination of each receiver with a plurality of type, priority, or type and priority of service.

13. The packet switching system of claim 9, wherein a single packet switch includes the plurality of interconnection elements, the plurality of receivers, and the distributor.

14. The packet switching system of claim 13, wherein the packet switch includes an input interface, which includes the distributor.

15. The packet switching system of claim 13, wherein the packet switch includes a plurality of switching planes, and each of the plurality of interconnection elements corresponds to a different switching plane of the plurality of switching planes.

16. A packet switching system comprising:
a distributor;
a receiver;
a plurality of interconnection elements coupled to the distributor and the receiver and forming a plurality of paths between the distributor and the receiver, the plurality of interconnection elements partitioned into a plurality of subsets of interconnection elements, each of the plurality of subsets of interconnection elements including at least two interconnections elements not in another of subset of the plurality of subsets of interconnection elements;
wherein the distributor is configured to identify for a current subset of the plurality of subsets which of the plurality of interconnection elements in the current subset are available to be selected in a current distribution cycle for the receiver and configured to send exactly a predetermined number of packets to the receiver through each of said interconnection elements in the current subset in the current distribution cycle for the receiver; and the packet switching system includes a selector to identify the current subset of the plurality of subsets of interconnection elements.

17. The packet switching system of claim 16, wherein a single packet switch includes the plurality of interconnection elements, the plurality of receivers, and the distributor.

18. The packet switching system of claim 17, wherein the packet switch includes an input interface, which includes the distributor.

19. The packet switching system of claim 17, wherein the packet switch includes a plurality of switching planes, and each of the plurality of interconnection elements corresponds to a different switching plane of the plurality of switching planes.

20. An apparatus for switching packets comprising:
a plurality of distributors, each including a plurality of input ports;
a plurality of receivers, each including a plurality of output ports; and
a plurality of interconnection elements, each coupled to each of the plurality of distributors and each of the plurality of receivers, forming a plurality of paths between each of the plurality of distributors and each of the plurality of receivers;
wherein the plurality of receivers are partitioned into a plurality of non-overlapping subsets with each of said non-overlapping subsets including at least two of the plurality of output ports, and wherein each of the plurality of input ports maintains one or more data structures indicating a current subset of the non-overlapping subsets and which of the plurality of interconnection elements in the current one of the non-overlapping subsets remain available to be selected in the current subset of a current distribution cycle, with a different distribution cycle defined for each input port-output port pair, and each of the plurality of input ports sends exactly a predetermined number of packets across each of the plurality of interconnection elements in a distribution cycle.

21. The apparatus of claim 20, wherein the predetermined number of times is one.

22. The apparatus of claim 20, wherein the predetermined number of times is at least two.

23. The apparatus of claim 20, wherein each of the plurality of input ports selects a distinct one of the plurality of interconnection elements indicated as available to send a packet in the current subset of the current distribution cycle corresponding to the output port to which a particular packet is to be sent, said selection based on a traffic pattern within the apparatus.

24. The apparatus of claim 20, wherein each of the plurality of input ports selects a distinct one of the plurality of interconnection elements indicated as available to send a packet in the current subset of the current distribution cycle corresponding to the output port to which a particular packet is to be sent, said selection based on congestion within the apparatus.

25. The apparatus of claim 20, wherein at least one of the interconnection elements includes an interconnection network.

26. The apparatus of claim 20, comprising buffers to buffer at least a portion of the packets to be sent from the plurality of distributors across the plurality of interconnection elements to the plurality of receivers, wherein each of the plurality of input ports selects which of the plurality of interconnection elements indicated as available to next send a packet in the current subset of the current distribution cycle corresponding to the output port to which a particular packet is to be sent, said selection based on queuing lengths of said interconnection elements indicated as available in the current subset of the current distribution cycle.

27. The apparatus of claim 20, wherein a different distribution cycle is defined for each combination of said input port-output port pair and a type, priority, or type and priority of service.

* * * * *

UNITED STATES PATENT AND TRADEMARK OFFICE
CERTIFICATE OF CORRECTION

PATENT NO. : 6,826,186 B1
DATED : November 30, 2004
INVENTOR(S) : Dittia et al.

It is certified that error appears in the above-identified patent and that said Letters Patent is hereby corrected as shown below:

Title page,
Item [56], References Cited, U.S. PATENT DOCUMENTS, insert the following references:

| | | | |
|---|---|---|---|
| -- 4,491,945 | A | 1/1985 | Turner |
| 4,494,230 | A | 1/1985 | Turner |
| 4,630,260 | A | 12/1986 | Toy et al. |
| 4,734,907 | A | 3/1988 | Turner |
| 4,829,227 | A | 5/1989 | Turner |
| 4,849,968 | A | 7/1989 | Turner |
| 4,893,304 | A | 1/1990 | Giacopelli et al. |
| 4,901,309 | A | 2/1990 | Turner |
| 5,127,000 | A | 6/1992 | Henrion |
| 5,173,897 | A | 12/1992 | Schrodi et al. |
| 5,179,551 | A | 1/1993 | Turner |
| 5,179,556 | A | 1/1993 | Turner |
| 5,229,991 | A | 7/1993 | Turner |
| 5,253,251 | A | 10/1993 | Aramaki |
| 5,260,935 | A | 11/1993 | Turner |
| 5,339,311 | A | 8/1994 | Turner |
| 5,402,415 | A | 3/1995 | Turner |
| 5,842,040 | A | 11/1998 | Hughes et al. --; and insert |

-- OTHER REFERENCES,
Jonathan S. Turner, "An Optimal Nonblocking Multicast Virtual Circuit Switch," Jun. 1994, Proceedings of Infocom, 8 pages.
Chaney et al., "Design of a Gigabit ATM Switch," Feb. 5, 1996, WUCS-96-07, Washington University, St. Louis, MO, 20 pages.
Turner et al., "System Architecture Document for Gigabit Switching Technology," Aug. 27, 1998, Ver. 3.5, ARL-94-11, Washington University, St. Louis, MO, 110 pages. --.

Column 10,
Line 39, replace "design," with -- design; --.

UNITED STATES PATENT AND TRADEMARK OFFICE
CERTIFICATE OF CORRECTION

PATENT NO. : 6,826,186 B1
DATED : November 30, 2004
INVENTOR(S) : Dittia et al.

It is certified that error appears in the above-identified patent and that said Letters Patent is hereby corrected as shown below:

Column 12,
Line 16, replace "claim 6" with -- claim 1 --.

Signed and Sealed this

Twenty-fifth Day of October, 2005

JON W. DUDAS
*Director of the United States Patent and Trademark Office*